R. N. BENNETT.

Assignor to A. C. EVANS.

Harrow.

No. 9,430. Reissued Oct. 26, 1880.

Attest.
M. M. Converse
Ora Converse

Inventor.
R. N. Bennett.
B. C. Converse, atty.

N. PETERS, PHOTO-LITHOGRAPHER, WASHINGTON, D. C.

UNITED STATES PATENT OFFICE.

ROSWELL N. BENNETT, OF UNION MILLS, INDIANA, ASSIGNOR TO AUSTIN C. EVANS, OF SPRINGFIELD, OHIO.

HARROW.

SPECIFICATION forming part of Reissued Letters Patent No. 9,430, dated October 26, 1880.

Original No. 96,191, dated October 26, 1869. Application for reissue filed August 7, 1880.

*To all whom it may concern:*

Be it known that I, ROSWELL N. BENNETT, a citizen of the United States, residing at Union Mills, in the county of La Porte and State of Indiana, have invented a new and useful Improvement in Harrows, of which the following is a specification.

My invention relates to improvements in harrows constructed with their sections hinged or flexibly connected together.

My invention consists, first, in a hand-lever attached to a harrow having its sections hinged together in its central longitudinal line by a pivot or pivot-bolt, so as to elevate said lever above the plane of the harrow-sections, and provided with hooks on each side above the point of attachment, from which chains extend to one of the beams of the same, whereby, upon a movement of said lever to either side, (its sweep crossing the line of draft,) the section on the opposite side is raised to a sufficient inclination to permit it to clear an obstruction or to discharge from its teeth any accumulation therein.

It further consists in a lever pivoted above the plane of a flexibly-connected sectional harrow, about the central longitudinal line thereof, so as to have a radial movement when operated across or at certain angles with the draft-line of the implement, said lever being so connected by chains or their equivalents with the sections as to elevate either side section by said radial movement when it is operated in a direction opposite to that of the section desired to be elevated, and, upon releasing the lever, allowing the section thus elevated to fall by its own gravity and cause said hand-lever to resume its normal position.

My invention further consists in the combination, with a hand-lever pivoted above the central longitudinal line of a sectional harrow having its sections hinged together and connected to one of the rails of said sections, of chains or their equivalents for forming said connections, whereby the same may be made adjustable by means of the links, to connect their inner ends with hooks attached on either side of said hand-lever, and the parallelism of the harrow-sections maintained.

The construction of my improvement and its operation are illustrated in the accompanying drawings, in which—

Figure 1:
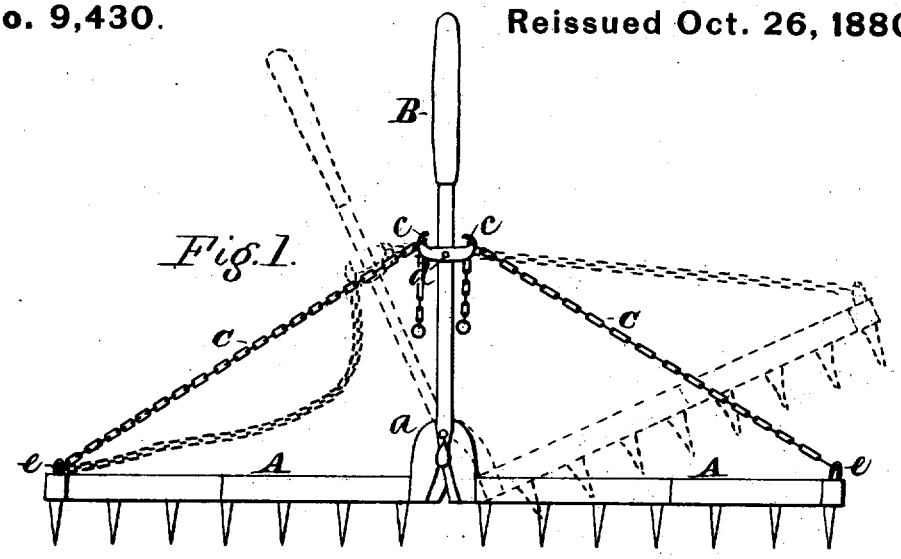
Figure 2:
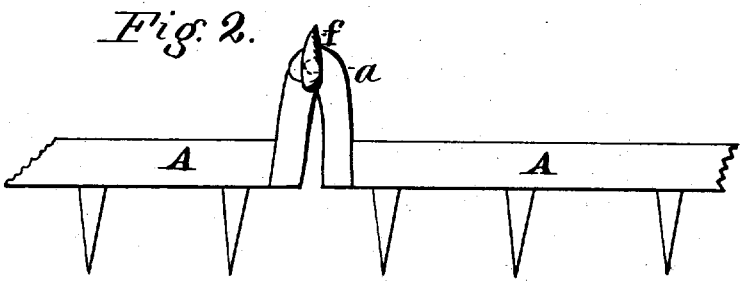
Figure 3:
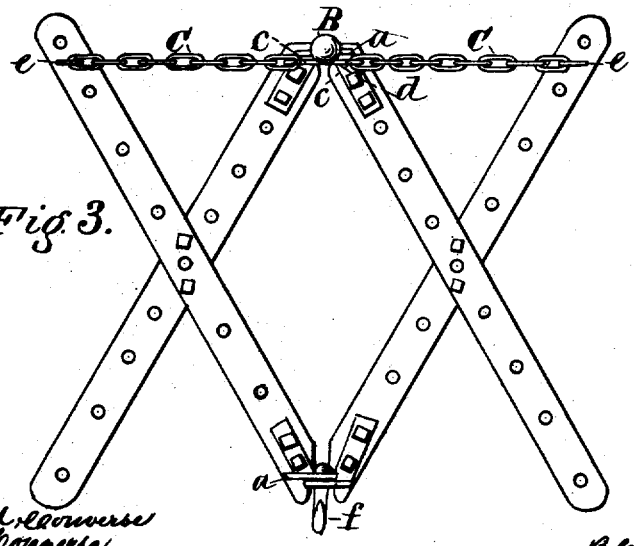

Figure 1 is a front elevation of a hinged sectional harrow having my improvement applied thereto. Fig. 2 is an enlarged view of the hinged connections. Fig. 3 is a plan view of a harrow having two X-shaped sections hinged together and my improvement applied to it.

A A are the sections of a harrow hinged together. B is a hand-lever pivoted to the rear hinge, *a'*. Both the hinges, *a* and *a'*, are elevated above the plane of the harrow. The hinges *a* and *a'* are formed of two pieces, are secured to the inside rails of the contiguous sections, and extend up above the harrow far enough to form a pivotal point for a lever. The hinge *a'* on the rear has the hand-lever B pivoted to it.

On each side of the hand-lever B are hooks *c c*, formed on an iron plate, *d*. A single point of attachment for the chains C, which connect the hand-lever by their hooks *c c* with staples *e*, (seen in the side rails of the harrow-sections A A,) might be used on the hand-lever. In Fig. 1 the harrow is shown with the ends of the chains depending below the hooks *c c*, for convenience in attaching and detaching them. In this figure the mode of operating my improvement is clearly illustrated by dotted lines, which describe the movement of the lever B and the section on the right connected therewith, as if the harrow were in motion and either an obstruction is to be avoided or accumulations of trash had lodged in its teeth. It will be noticed that the operation is simple and easily performed and fully sufficient for the objects described. By a movement of the lever B to the right the left harrow-section is elevated in the same manner.

A draft-hook, *f*, is shown attached to the front hinge, forming a pivot to the same.

I claim as my improvement—

1. In a hinged harrow, the following elements: a lever pivoted on the middle longitudinal line thereof and chains or their equivalents connecting said lever with hinged sections on either side, whereby said sections may be elevated to avoid obstructions or to free it from accumulations in the teeth.

2. In a sectional harrow having its sections hinged together, the combination, with a pivoted lever located above the plane of the harrow, of chains or their equivalents extending from said lever to the hinged sections, for the purpose of elevating said sections by a movement of said lever, as hereinbefore set forth.

3. In a hinged harrow, the combination, with the hinged sections, of an operative lever pivoted to the same and adapted to have a free radial movement, whereby a section on either side may be elevated through chains or their equivalents connected thereto.

4. The combination of lever B and chains C with a hinged harrow, substantially as shown and specified, as and for the purpose set forth.

ROSWELL N. BENNETT.

Attest:
G. L. McLANE,
W. H. WORDEN.